Aug. 18, 1942.  T. C. VAN DEGRIFT  2,293,371
BALANCING MACHINE
Filed March 31, 1937  10 Sheets-Sheet 1

Fig. 1

Inventor
Thomas C. Van Degrift

Aug. 18, 1942.　　　T. C. VAN DEGRIFT　　　2,293,371
BALANCING MACHINE
Filed March 31, 1937　　　10 Sheets-Sheet 2

Inventor
Thomas C. Van Degrift
By Blackmore, Spencer & Flint
Attorneys

Aug. 18, 1942.　　T. C. VAN DEGRIFT　　2,293,371
BALANCING MACHINE
Filed March 31, 1937　　10 Sheets-Sheet 4

Fig. 9

Inventor
Thomas C. Van Degrift
By Blackmore, Spencer & Flint
Attorneys

Aug. 18, 1942.  T. C. VAN DEGRIFT  2,293,371
BALANCING MACHINE
Filed March 31, 1937  10 Sheets-Sheet 5

Inventor
Thomas C. Van Degrift
By Blackmore, Spencer & Flint
Attorneys

Fig. 12
Fig. 13
Fig. 14
Fig. 15

Inventor
Thomas C. Van Degrift

Aug. 18, 1942.  T. C. VAN DEGRIFT  2,293,371
BALANCING MACHINE
Filed March 31, 1937   10 Sheets-Sheet 8

Inventor
Thomas C. Van Degrift
By Blackmore, Spencer & Flint
Attorneys

Aug. 18, 1942. T. C. VAN DEGRIFT 2,293,371
BALANCING MACHINE
Filed March 31, 1937 10 Sheets-Sheet 9

Inventor
Thomas C. Van Degrift

Patented Aug. 18, 1942

2,293,371

UNITED STATES PATENT OFFICE 2,293,371

BALANCING MACHINE

Thomas C. Van Degrift, Detroit, Mich., assignor to General Motors Corporation, Detroit, Mich., a corporation of Delaware Application March 31, 1937, Serial No. 133,995

20 Claims. (Cl. 73—53)

This is an improvement on balancing machines of the type described and claimed in Patent No. 1,822,860, issued on September 8, 1931, to C. E. Summers and the present applicant.

In this type of machine it is the usual procedure to hold the part to be balanced for rotation about its geometrical axis at one end, while permitting it free movement at the other end, and to measure the eccentricity of the movement performed by the free end of the shaft, both with respect to its maximum amount and the angular location of the maximum eccentricity with respect to the shaft. This operation is then repeated with the first end free and the other end restrained for rotation about its geometrical axis. By properly calibrating the machine, it is possible to ascertain from the readings thus obtained, the approximate amount of metal required to be removed or added to balance the shaft, and also the angle in the plane of correction at which the removal or addition should be made.

This method of balancing is subject to error because unbalance at one end of the shaft affects the reading of unbalance at the other end of the shaft so that neither reading is an accurate measure of the unbalance at that end. While this error is reduced by calibration and could theoretically be eliminated by taking the indication of unbalance in the same plane in which metal is removed to balance the shaft, the latter is not practical in production inasmuch as the indicator arm must bear against a surface concentric with the axis such as one of the shaft bearings, and it is usually neither practical nor convenient to remove metal at the bearings or in planes having a resultant at the bearings. This impracticability is especially obvious in the case of automobile crankshafts where the removal or addition of material to effect balance usually must be made on the crankshaft cheeks or on counterbalancing weights, the location of which is determined primarily by crankshaft design, and only partially by consideration of convenience in balancing in this type of balancing machine.

The inaccuracy inherent in this method of balancing may be further reduced by repeating the balancing operation after one correction and adding or removing the additional amount of material indicated. By repeating the operation a sufficient number of times substantially perfect balance may be obtained, but this is expensive because of the additional labor involved.

Careful experiments have shown that if a perfectly balanced shaft is unbalanced as by adding weight at some point along the shaft toward one end of it, the shaft will, when rotated, with both ends free, perform a gyratory movement about a nodal point toward the other end. If the amount of weight added at the same place along the shaft is increased, the amplitude of gyration is increased. If it is decreased, the amplitude is decreased. But in either case the position of the nodal point remains unchanged.

If an indicator for measuring the eccentricity of the motion of the shaft is engaged with it at such nodal point it will indicate no eccentricity for here the shaft is performing a movement of true rotation about its geometric axis. If additional unbalance is now added to the same shaft but toward its other end, that is, toward the same end where the nodal point is located, this same indicator, located at this same nodal point, will indicate that the shaft is now performing an eccentric movement. Obviously the eccentric movement is caused by the unbalance just added and the amount of unbalance will be in direct proportion to the maximum amount of eccentricity of the movement of the shaft shown by the indicator and hence may be measured by it.

By repeating the described operation but with unbalance first added to the other end of the perfectly balanced shaft, a second nodal point may be ascertained and an indicator positioned at this nodal point will in like manner indicate the amount of unbalance at its end of the shaft.

Hence by providing two indicators, each engaging the shaft at a nodal point, each indicator will give an accurate indication of the amount of unbalance added at the selected point at its end of the shaft free from any effect of unbalance at the other end.

It is obvious that the position of these nodal points depends upon the points along the shaft at which the unbalance is added for, if the same amount of unbalance is added at a different point, the shaft, in achieving rotating balance, will have to assume a different inclination. Hence in applying this invention it is necessary to first select these points or planes in which unbalance is added at the ends of the shaft. For convenience in calibration it is desirable to have these planes of unbalance so chosen as to coincide with the planes in which metal may be conveniently added to or removed from the shaft to effect balance. In practice it is customary to effect balance by removing metal rather than by adding it.

The first thing to do, therefore, is to select the planes of unbalance or the planes of correction as they may be termed, and the next thing to do is to ascertain the corresponding nodal points by applying unbalance to a perfectly balanced shaft first in one of these planes and then in the other and rotating the shaft as described to ascertain the corresponding nodal points. With the nodal points ascertained the machine may be calibrated by applying known, graduated amounts of unbalance in these planes and observing the corresponding indications. These indications may be correlated with the crank shaft angle in the same manner as described in the Summers and Van Degrift patent referred to, that is, by connecting the shaft in a predetermined angular relation with the drive shaft for rotating it and by employing an indicator having a part driven in synchronism with the drive shaft for indicating the angle corresponding to indicated unbalance.

With this done, shafts having an unknown amount of unbalance may be spun in the machine and the indicators at the nodal points will each give a correct indication of the amount and angle of unbalance at its end. The amount of metal indicated may then be removed at the angles indicated and the shaft is balanced. Obviously it is not essential that the metal be removed in the selected plane of unbalance but may be removed in any other plane or planes in an amount which would have the same effect as removing the indicated amount in the plane of unbalance but this necessitates the use of charts or tables for converting amounts of unbalance in one plane into equivalent amounts in other planes and is generally an unnecessary inconvenience.

The above explanation assumes that the indicators may be directly engaged with the shaft to be balanced at the nodal points. This is usually not convenient for the indicator must of course engage a part concentric with the shaft axis, usually a journal, and it most frequently happens that the part to be balanced is of such design that no such concentric portion exists at the nodal points. Hence I have found it most desirable to employ an intermediate part such as a rigid element and to actuate this part from the rotating shaft so that it rocks in synchronism with the gyratory movement of the shaft. This rocking part will possess nodal points corresponding to the nodal points on the shaft and the indicators may be engaged with the part at these points. By proper calibration substantially the same accuracy of results may be obtained as if the indicators directly engaged the shaft.

This invention effects substantial improvement in the accuracy of machines of the type referred to, and also greatly increases the speed of operation since the shaft need be rotated but once with both ends free and successive balancing and correcting operations are not necessary for one is sufficient to balance the shaft with the required accuracy.

Obviously the principles embodied in this invention are susceptible of application in many different forms of balancing machines and the accomapnying drawings show but a few illustrations of these.

Figure 1:
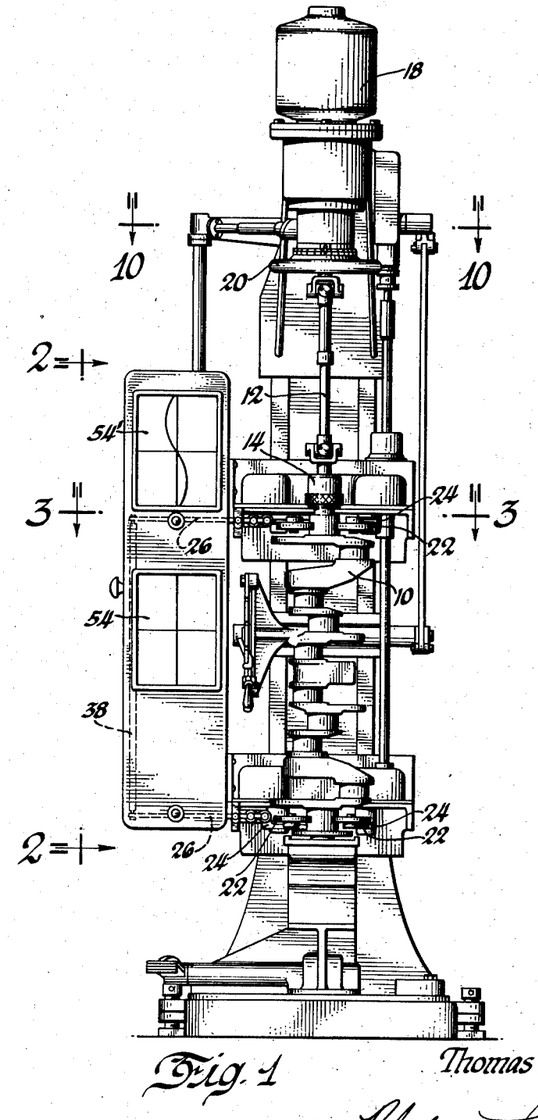
Figure 1 is a front view of my improved balancing machine.
Figure 2:
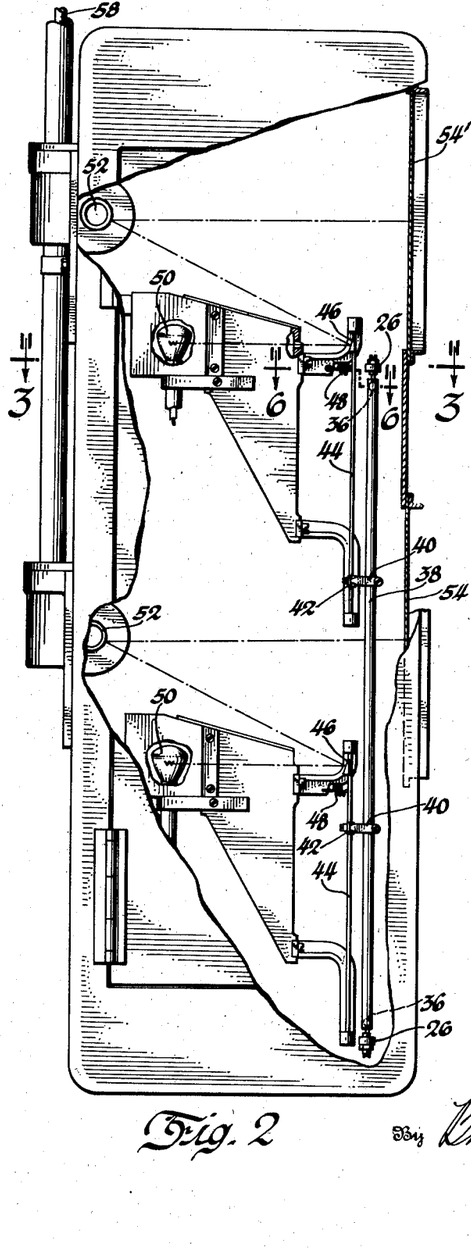
Figure 2 is a view of the indicating mechanism taken on line 2—2 of Figure 1 with portions of the cover broken away.
Figure 3:
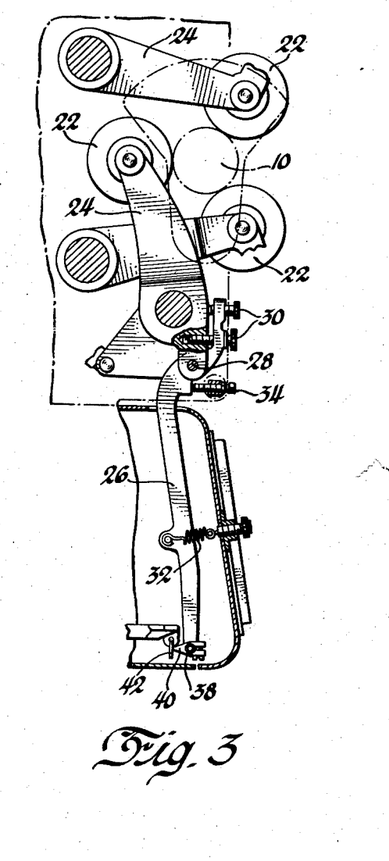
Figure 3 is a fragmentary section on line 3—3 of Figures 1 and 2.
Figure 9:
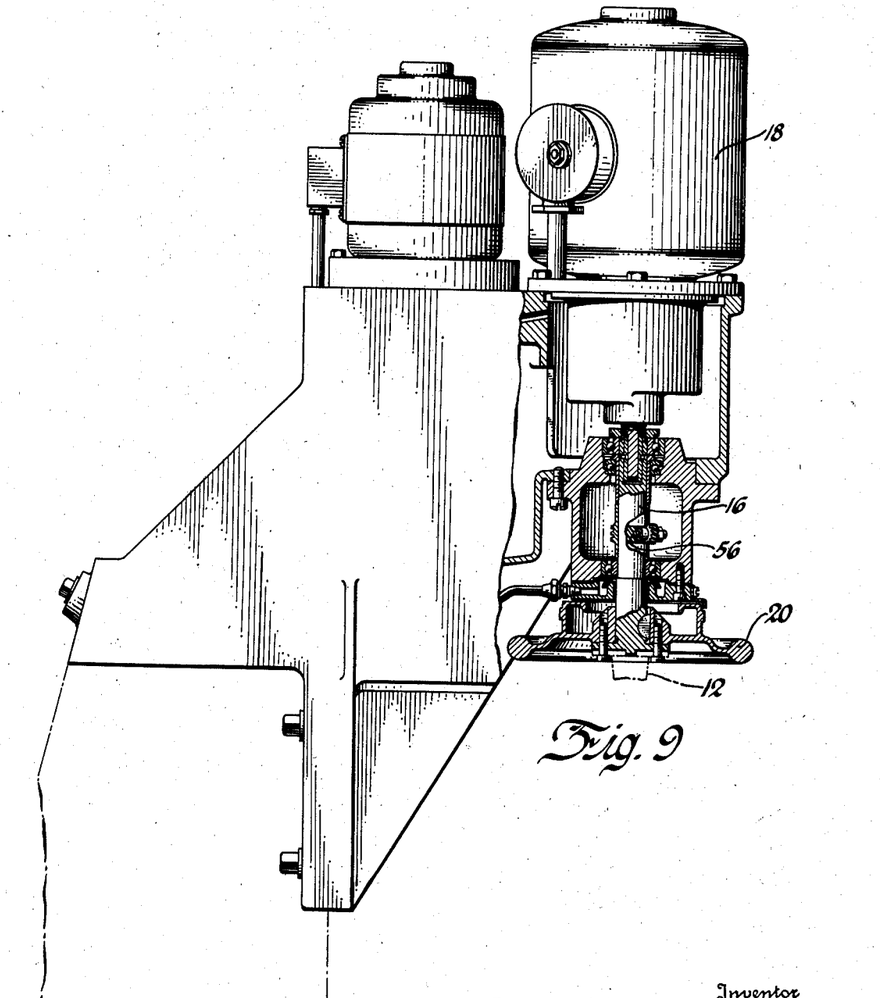
Figure 9 is a view, partly in section, showing the driving means for the part to be balanced.

The balancing machine to which my invention is shown applied in Figure 1 is of the type disclosed and claimed in the Summers and Van Degrift Patent 1,822,860, above referred to, and is especially designed for the balancing of crankshafts. In order to permit the crankshaft 10 to be substantially free to assume a position of rotating balance it is suspended from a universally jointed shaft 12 by means of any suitable kind of detachable coupling 14. The shaft 12 is secured as shown in Figure 9 to a rotatably mounted shaft 16 journaled in the upper portion of the frame of the machine and driven by any suitable means such as an electric motor 18. Hand wheel 20 is preferably connected to the shaft 16 as shown to permit the operator to rotate the crankshaft to any desired angular position. As shown in Figures 1 and 3 and as disclosed in detail in the said prior Summers and Van Degrift patent the top and bottom journal portions of the shaft 10 are engaged by guide rollers 22 carried by levers 24 which are spring pressed or otherwise resiliently urged in a direction to cause the rollers to press against the shaft, but to yield to movements of the shaft resulting from out-of-balance. In the Summers-Van Degrift machine one of the levers 24 of each set is employed to directly actuate suitable indicating mechanism, but according to the illustrated embodiment of my invention these levers 24 have secured to them extensions 26 preferably by means of pivots 28 and set screws 30 which permit of adjustment of the extensions so as to keep the indicating rays of light described hereinafter on the scales provided for them when shafts of different sizes are being tested. 32 indicate adjustable tensioned springs tending to swing the extensions 26 about the pivots 28, and hence also to swing the corresponding levers 24 and their rollers 22 away from engagement with the crankshaft, but these springs are of negligible strength compared with the strength of the springs, not shown, swinging the roller-carrying ends of arms 24 toward the shaft. While springs 32 do not interfere with the primary function of the parts 22—24—26 in following the crankshaft in its movements they do tend to hold the extensions 26 in proper position and take up any looseness. 34 indicate set screws which adjustably limit the swinging movement of the parts 22—24—26 in one direction. All of the parts 28, 30, 32, and 34 serve solely to provide adjustable but rigid and unyielding connections between the arms 24 and their extensions 26.

Figures 4, 5, 6, 7, 8:
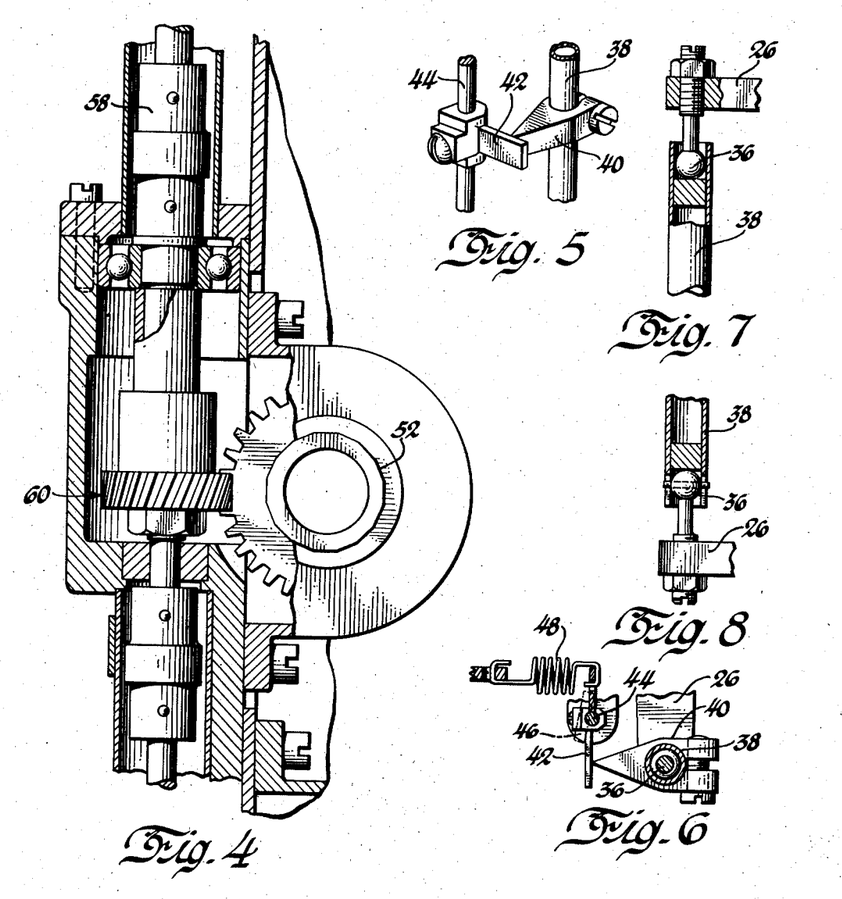
Figure 4 is a fragmentary sectional view of the drive for the mirror of the indicating mechanism.
Figure 5 is a perspective view of the operating connection between the rigid element and the indicating mechanism.
Figure 6 is a section on line 6—6 of Figure 2.
Figure 7 is a fragmentary view, partly in section, showing the connection between the upper end of the rigid element and the part operating it.
Figure 8 is a similar view showing the bottom connection.

To the outer ends of the extensions 26 are adjustably secured ball-headed studs 36 fitted in sockets provided in the ends of a rigid element 38 preferably in the form of a tube as shown in Figures 7 and 8.

With this arrangement so far described, it will be apparent that when the motor 18 is driven to rotate the crankshaft, if there is unbalance in it, the shaft will perform a wobbling or gyratory movement as a consequence of its assuming a position of rotating balance under the action of its inertia forces and the resulting eccentric movement of its journals will cause the levers 24 and extensions 26 to oscillate producing similar movement of its rigid element 38. However, the movement of the element 38 will be confined to substantially a single plane since the amplitude of movement of its ends is relatively slight. This movement of the rigid element 38 is employed to actuate a pair of indicators of identical construction. Lugs 40 of the construction best shown in Figures 5 and 6 are mounted on rigid element 38 at nodal points determined as described. The lugs 40 preferably have pointed ends which engage lugs 42 adjustably secured on rockshafts 44. On each rockshaft 44 is rigidly secured a mirror 46. Springs 48 yieldingly hold the lugs 42 in engagement with the lugs 40. The parts 40 engage the parts 42 in the angular relation in Figure 6 so as to secure the desired amplification of the movement.

Figure 15:
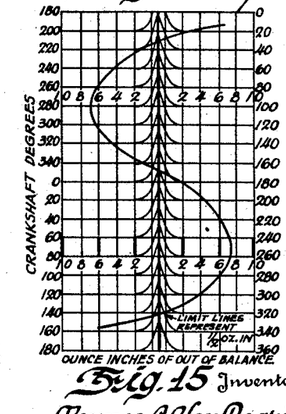
Figure 15 shows a typical curve of unbalance plotted on a chart of the kind used with my machine.

As in the Summers and Van Degrift patent above referred to the mirrors 46 are adapted to receive a beam of light from a suitable lamp 50 and to project the beam on a rotating polygonal mirror 52 which in turn reflects the beam causing it to trace a curve on a suitable translucent calibrated chart 54 or 54', preferably bearing the markings as shown in Figure 15.

Figures 10, 11:
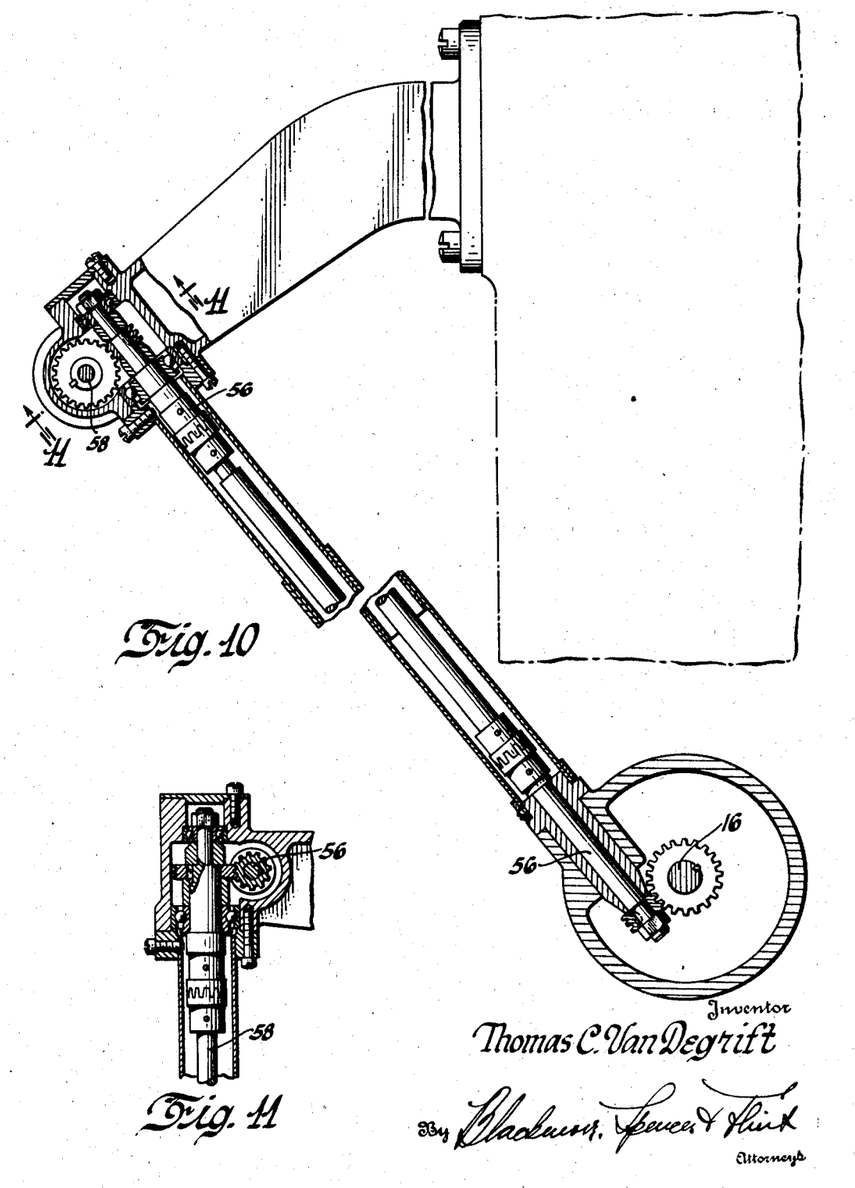
Figure 10 is a section through the upper portion of the driving means for the revolving mirror of the indicating mechanism taken on substantially line 10—10 of Figure 1.
Figure 11 is a section on line 11—11 of Figure 10.

The polygonal mirrors 52 are rotated by the same driving means that rotates the shaft so that the shaft being tested occupies a definite angular relation with respect to the mirror, and hence the chart 54 may be calibrated in crankshaft degrees as shown in Figure 15. The drive for the rotating mirror is shown in detail in Figures 10, 11 and 4, and consists of a shaft 56 driven by suitable gearing from the driving shaft 16 of the motor 18. Shaft 56 in turn drives the shaft 58 through suitable reduction gearing shown in Figures 10 and 11. The shaft 58 drives the mirror shafts through suitable gearing one set of which is shown at 60 in Figure 4.

As previously stated, it is important that the indicating mechanism be so arranged as to measure the eccentricity of movement of the shaft at nodal points, so that the reading taken at each end may give a true indication of the amount of unbalance at that end. In the mechanism just described this is accomplished by locating lugs 40 at the nodal points on the rigid element 38, and Figures 12 to 14 have been provided to bring out the principle involved.

Figure 12:
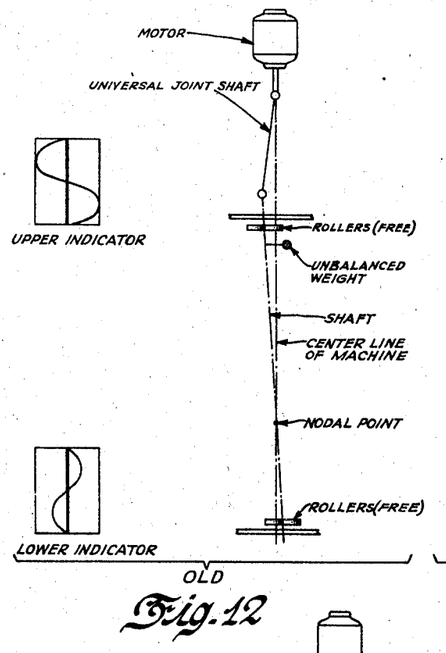
Figure 12 indicates diagrammatically the operation of the balancing machine of the Summers and Van Degrift patent with the rollers at both ends free.

In Figure 12 there is shown diagrammatically the machine of the Summers-Van Degrift patent operated with both top and bottom sets of rollers free to yield to movements of the shaft. The shaft is driven from the motor by a universally jointed shaft as usual, and, as described in detail in the said patent, certain of the roller-carrying levers directly actuate the tilting mirrors of the indicating mechanisms. The shaft illustrated is in perfect balance except for the unbalanced weight at one end. With this arrangement the light beams of the indicators trace on the charts curves of the form shown. These curves are typical of curves produced by the indicating mechanism used both on my machine and on the machine of the patent and indicate by their amplitude the amount of unbalance and by the location of the peak of the curve, the angular position of the unbalance. It will be noted that while there is out-of-balance at one end of the shaft only, the charts show out of balance at both ends and neither reading gives a true indication of the total unbalance. While the accuracy and convenience of the machine are improved by locking the rollers at one end as described in the patent while taking readings at the free end, the same fundamental error persists,—each of the indicator readings is somewhat affected by the unbalance at both ends and neither reading is therefore correct.

Attention is called to the nodal point on Figure 12. The moments of inertia of the shaft on opposite sides of this nodal point balance each other so at this point the shaft performs a movement which is substantially pure rotation about its geometric axis.

Figure 13:
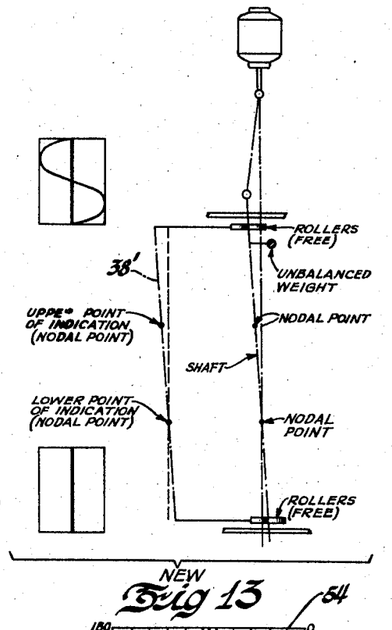
Figure 13 indicates diagrammatically a balancing machine made in accordance with my invention and discloses the indications obtained when testing a shaft having the same unbalance as the shaft indicated in Figure 12.

Figure 13 is the same as Figure 12 except that a rigid element 38' is arranged to be actuated by one pair of shiftable rollers so that the element has an oscillating movement produced by the wobble of the shaft due to unbalance. The lower nodal point is the same as that shown on Figure 12. The upper nodal point is ascertained in the same manner, that is, by observing the rotation of a perfectly balanced shaft to the lower part of which has been added an unbalanced weight in a location corresponding to that of the unbalanced weights shown in Figures 12 and 13. The same nodal points are reproduced in the movement of the rigid element 38', and at these points on the element the indicators are connected. The charts show the corresponding curves. It will be noted that the lower indicator correctly shows perfect balance while the upper indicator shows unbalance, and it will be found that the amplitude of the indication of unbalance is directly proportional to the amount of it. The reading of the bottom indicator is not affected by the unbalance at the upper end of the shaft because of the location of the indicator at a nodal point, i. e., a point of zero deflection for the unbalance at the upper end of the shaft.

Figure 14:
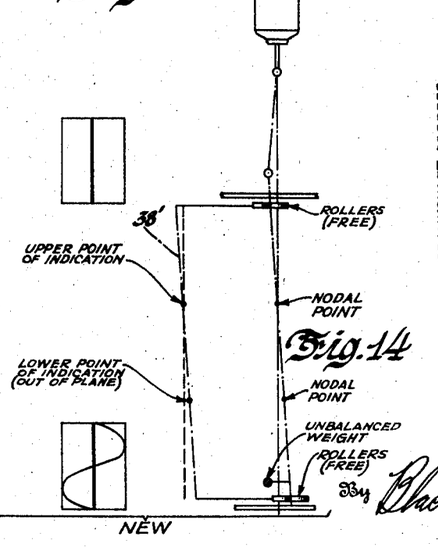
Figure 14 is the same as Figure 13 except that it shows the indications obtained with unbalance at the bottom end of the shaft.

Figure 14 is the same as Figure 13 except that the shaft being tested is shown out-of-balance at the bottom end only and the indication taken at the lower nodal point measures that out-of-balance. Obviously, if the shaft were out-of-balance at both ends measurements taken at both nodal points would show out-of-balance, and each measurement would be an accurate indication of the unbalance existing at its end of the shaft.

It will be apparent that the same readings would be obtained if the indicators were actuated by parts directly contacting the shaft at the nodal points. However, this is impractical in the case of irregular objects such as crankshafts, although it is quite practical where the objects are of such shape as to afford circular bearing surfaces coaxial with the axis of the shaft at the nodal points.

It will be understood also that the readings are an indication of the unbalance existing in the selected planes of unbalance producing the nodal points. Usually it will be convenient to arbitrarily select these planes for a given shaft giving consideration solely to convenience in adding or removing metal to effect the correction so that the planes become the planes of correction also. However, if desired, the correction may be made in some other plane by providing tables or curves for converting a correction in one plane into an equivalent correction in another plane or planes.

It will be noted by reference to the chart reproduced in Figure 15 that the abscissae representing crankshaft angles are bent upwardly in approaching the zero position. This modification of the chart is based on actual observations of the effect of small amounts of unbalance, and is desirable to give the highest possible accuracy to readings. It is believed that the lag is due to the effects of friction and inertia and the action of springs used in the mechanism producing the indication.

Figures 16, 17:
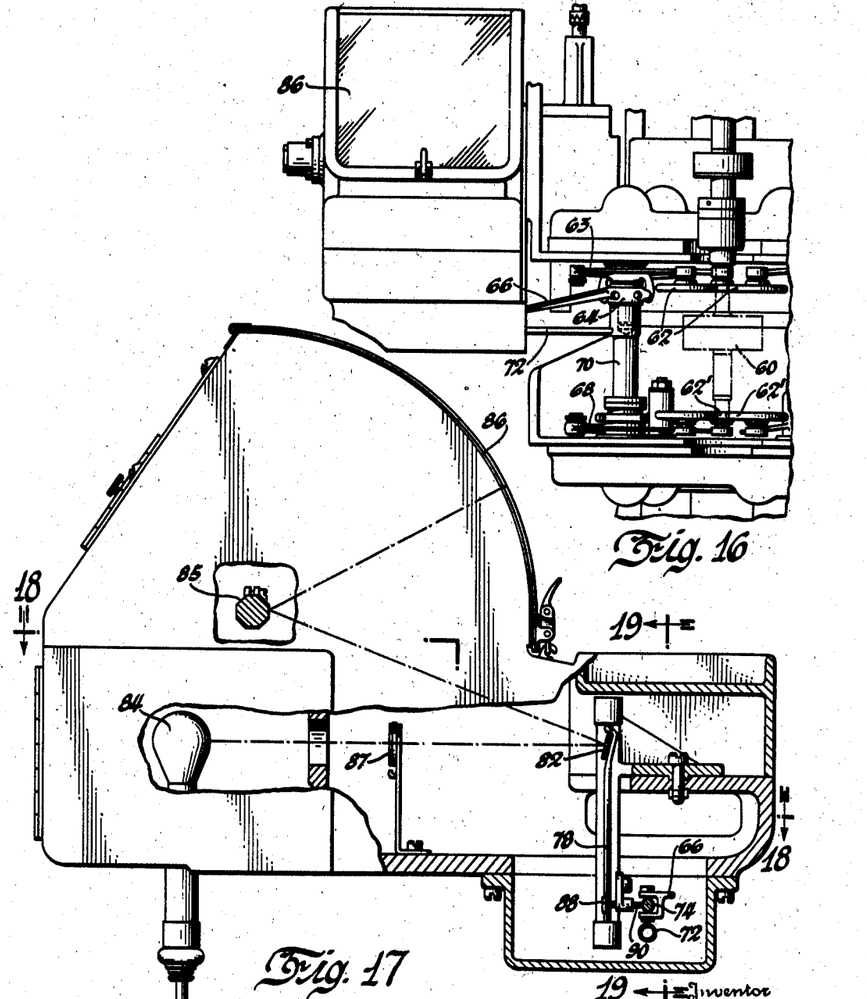
Figure 16 is a fragmentary front elevation of another form of balancing machine embodying my invention, and especially adapted for the balancing of small parts, such as armatures.
Figure 17 is a side elevation of the indicating mechanism of Figure 16 with a portion of it shown in section.
Figure 18:
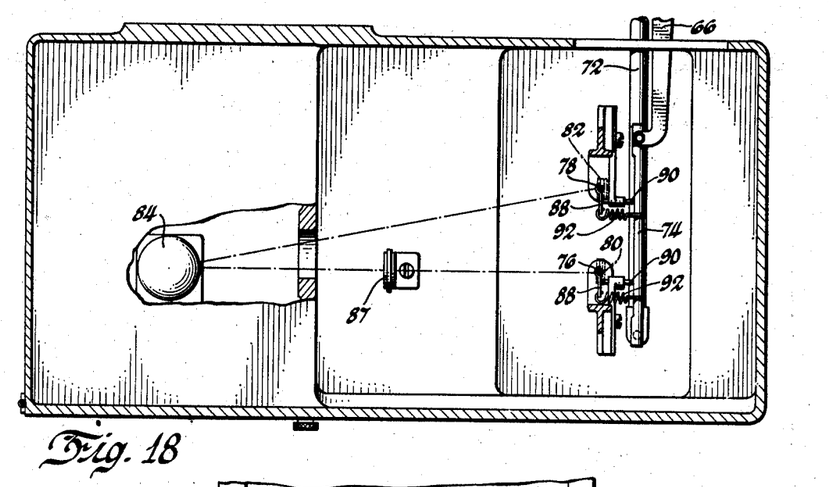
Figure 18 is a view taken on line 18—18 of Figure 17 with parts broken away.
Figure 19:
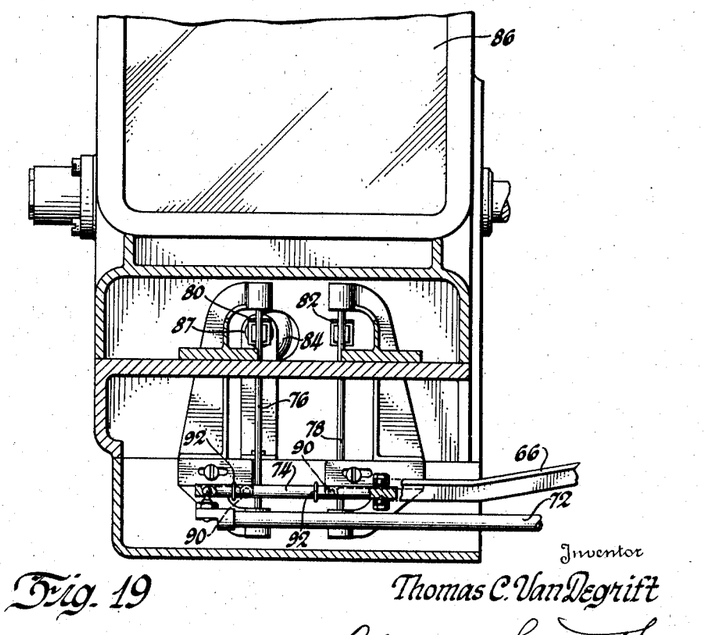
Figure 19 is a section taken on line 19—19 of Figure 17.

The modified balancing machine shown in Figures 16 to 19 is especially designed for the balancing of smaller objects, but embodies the same principle of locating the actuating means for the indicators so as to measure at the nodal points the movement resulting from unbalance. Here 60 indicates an armature or other small part to be balanced. 62 indicates the upper guide rollers engaging a journal at one end of the armature and 62' indicate guide rollers engaging the lower journal of the armature. The guide rollers are mounted as before on pivoted spring pressed arms which yieldingly hold them in engagement with the journals. The rearmost guide roller 62, as shown in Figure 16, is mounted on arm 63 which is rigidly connected to rockshaft 64 having arms 66 extending outwardly therefrom into indicator box. In like manner the rearmost roller 62' is mounted on arm 68 rigidly mounted on rockshaft 70 which is coaxial with the rockshaft 64, but is independently operable. From the rockshaft 70 arm 72 extends into the indicator box. As best shown in Figure 19 the end of the arm 66 is pivoted to rigid element 74 and the end of the arm 72 is pivoted to the other end of the rigid element. This element corresponds to rigid element 38 of the first form of the invention and functions in the same way, that is, the gyratory movement of the part being balanced produces oscillation of the rollers 62 and 62' connected to the rockshafts 64 and 70, respectively, and the resulting oscillations of the rockshafts are transmitted through arms 66 and 72 to the rigid element 74.

Mounted within suitable bearings in the indicator box are rockshafts 76 and 78 carrying mirrors 80 and 82, respectively, which project rays of light from source 84 onto the revolving polygonal mirror 85 as shown in Figure 17 which in turn reflects the ray onto the translucent chart 86. Color screen 87 is provided to color the light going to mirror 82 so that the curve it traces on the chart may be distinguished from that reflected from the other mirror. Each of the rockshafts carries a lug 88 which engages a member 90 slidably mounted in fixed guides carried by the indicator housing. The members 90 engage the rigid element 74 at nodal points determined as previously described so that the oscillation of the rigid element 74 in a plane perpendicular to the paper in Figure 19 produces reciprocation of the members 90 and oscillation of the mirror carrying shafts 76 and 78. Springs 92, best shown in Figure 18, hold the rigid element 74, the detents 90 and the lugs 88 in operative relation.

This form of the invention differs from that first described principally in the fact that both curves are traced on the same chart, and the construction is thus simplified.

In Figures 20 to 24 there is shown a further modification. Here the part to be tested is shown as a crankshaft 100 and it is mounted in a frame 102 having journals 104 mounted in split bearings 106 carried by arms 108 supported at one end by springs 110 and at the other end by pivots 112 mounted in arms 114 and 114' pivoted to the base of the machine.

Figure 20:
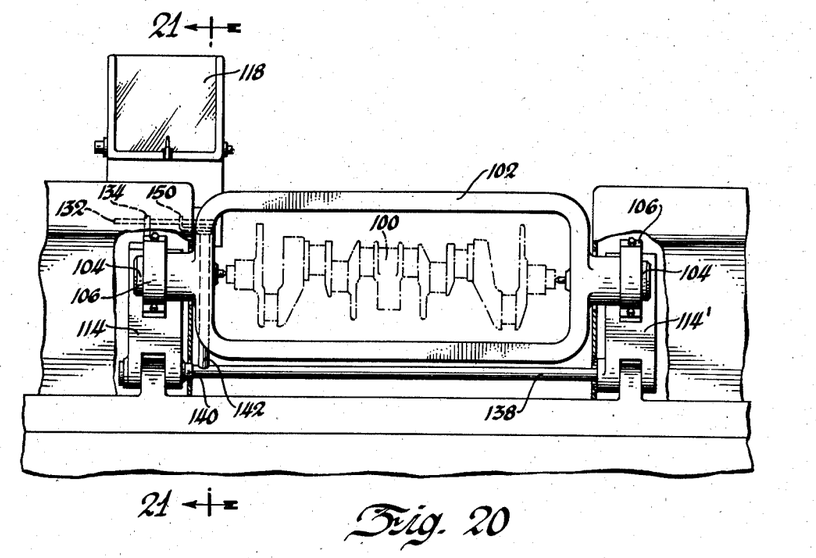
Figure 20 is a fragmentary front elevation of the application of my invention to a mass centering machine.
Figure 21:
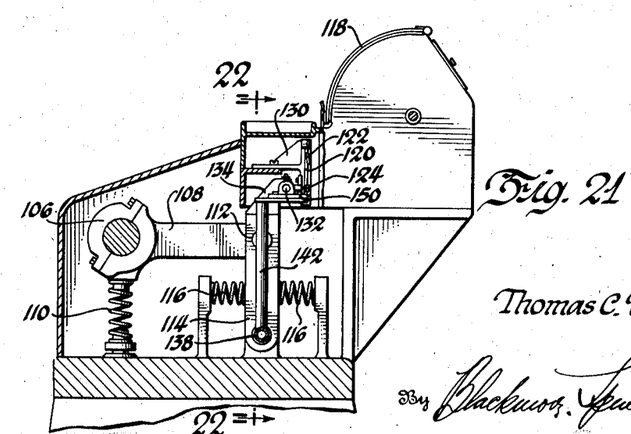
Figure 21 is a view on line 21—21 of Figure 20.
Figure 22:
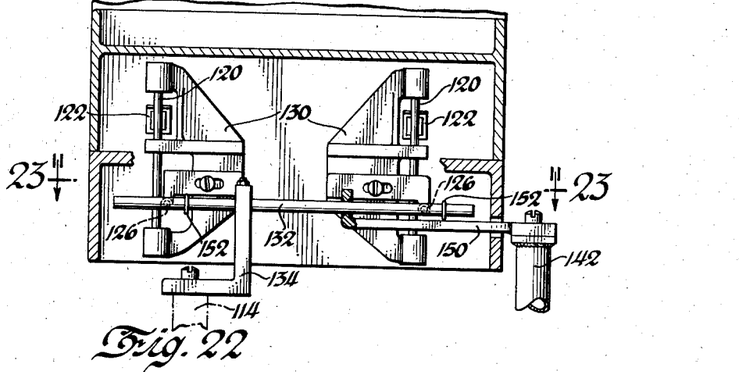
Figure 22 is a fragmentary section taken on substantially line 22—22 of Figure 21.
Figure 23:
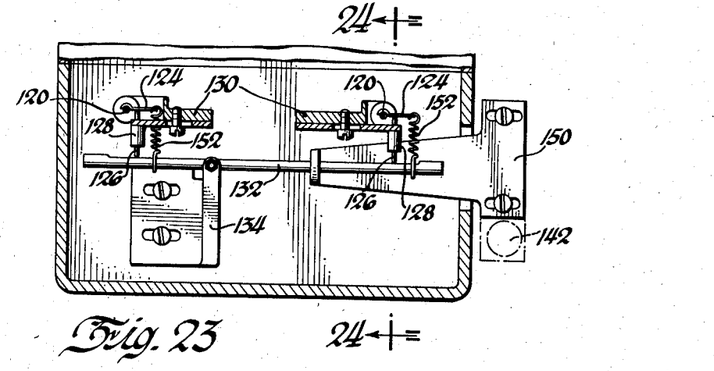
Figure 23 is a section on line 23—23 of Figure 22.
Figure 24:
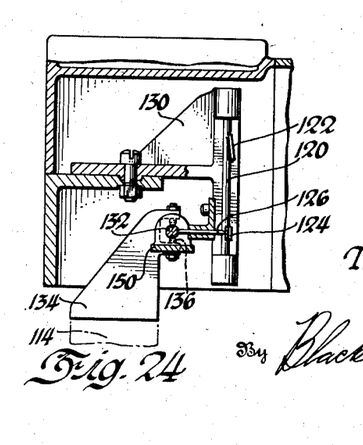
Figure 24 is a section on line 24—24 of Figure 23.

In this form of the invention the part being tested may be considered to comprise the balancing frame 102 together with the crankshaft 100 mounted in it, the purpose of this arrangement being to determine the center-line about which the crankshaft is in balance as described in my prior Patent No. 1,761,945, granted June 3, 1930. This assembly is free to assume a position of rotating balance because it is permitted up and down movement by pivoting about the pivots 112, the movement being cushioned by springs 110, and it is permitted lateral movement by pivotal movement of links 114 and 114' which are cushioned by springs 116. The links 114 and 114' move as a result of gyratory movement of the part to be balanced caused by unbalance and the motion of these links is used to operate the indicating mechanism. This manner of mounting the part to be balanced is described and claimed in my prior Patent 2,008,161, granted July 16, 1935.

The balancing machine shown in Figure 20 is likewise provided with a single indicator having a chart 118 upon which are projected both of the graphs produced by the pencils of light projected by two mirrors, one actuated by movement of one end of the part to be balanced and the other by movement of the other end of the part to be balanced. The indicating mechanism includes two rockshafts 120 carrying mirrors 122 arranged to receive beams of light from a suitable lamp as in the previous forms of the invention. To each of the rockshafts is secured a lug 124 bearing against a member 126 mounted for sliding movement in guide 128 carried by the bracket 130 in which the rockshaft 120 is mounted. 132 indicates a rigid element actuated by movement of opposite ends of the part to be balanced. To accomplish this, there is adjustably mounted on the end of link 114 an L-shaped member 134 connected to the element 132 by a vertical pivot which may be of the type shown at 136 in Figure 24. Motion of the link 114' at the other end of the machine is transmitted to the indicator through rod 138 rigidly clamped to the link 114'. The end 140 of the rod 138 is supported by a pilot bearing in the member 114 so as to enable it to rock independently of that member. Arm 142 extends upwardly from rod 138 and has adjustably secured to its upper end a stamping 150 apertured at its free end to receive the rigid element 132. Coil springs 152 yieldingly connect the rigid element 132 with the lugs 124 on the rockshafts 120 and thereby yieldingly hold the rigid element 132, sliding member 126 and lug 124 in engagement. The adjustable connection of the plates 134 and 150 with their actuating members 114 and 142, respectively, permit the parts to be adjusted to handle different sized parts requiring balancing.

In this form of the invention the engagement of the reciprocating members 126 with the rigid element 132 is likewise at the nodal points corresponding to unbalance lying in selected planes at the opposite ends of the shaft. In this case the nodal points happen to lie outside of the points of connection of the actuated means to the rigid element. This is probably due to the peculiarities of mass centering machines. In such machines, as described in my prior Patent No. 1,761,945, the rotating mass includes not only the crankshaft but also the frame 102 in which the crankshaft is adjustably mounted and the mass is put in balance not by adding or removing metal in selected correction planes but by adjusting the position of the crankshaft in the frame. By adjusting one end only of a perfectly balanced shaft out of its balanced position in the frame so as to create unbalance in the rotating mass, one nodal point may be ascertained. The nodal point for the other end of the shaft is found by repeating the same operation with the other end of the shaft. With nodal points thus determined the machine may be calibrated by observing the amount and angle of out of balance movement produced by given amounts of displacement of the ends of the shaft. It will be observed that shifting the position of the shaft in the frame changes the distribution of weight in the entire rotating mass and it is believed to be this that is responsible for the observed fact that the nodal points lie outside of the points of connection with the rigid element.

In the practical operation of all of these machines the first thing to do is to study the part to be balanced and determine the places at each end of the part to be balanced where it is convenient to remove or add metal to put the shaft in balance. These points may be called the planes of correction. A perfectly balanced part of the same design as the parts to be balanced is then put in the machine and weight is applied to the part in one plane of correction and the nodal point is noted. The part is then restored to balance and unbalance is applied in the other plane of correction and the second nodal point is observed. If the nodal points occur on concentric cylindrical portions of the part to be balanced the actuating means for the indicator,— in this case the rocking means for the tilting mirror,—may be directly engaged by the shaft at the nodal points, and in this case each indicator will give an indication of the unbalance at its end of the shaft. Usually this is inconvenient owing to the irregular shape of the part to be balanced, and in that case, as shown on the drawings, one of the followers yieldingly restraining movement of one end of the shaft is connected to one end of a rigid element while a similar follower at the other end of the shaft is connected to the other end of the element. The rigid element will then perform an oscillating movement corresponding in amplitude to the oscillating movement of the shaft and by connecting the indicators to the nodal points of the rigid element substantially the same result is obtained as if the indicators were directly engaged with nodal points on the shaft. The machine is now calibrated by applying different amounts of unbalance to a perfectly balanced part in the planes of correction plotting the corresponding deflections in terms of ounces-inches of out-of-balance.

With the machine calibrated it is then but necessary to put a similar part to be balanced in the machine and spin it whereupon two indications of out-of-balance are obtained, one giving the out-of-balance at the one end of the shaft and the other at the other end. The part may then be removed from the machine and the indicated amount of metal may be removed at the indicated angle in the plane of correction. Practical experience with this invention has proven that corrections so made are of a high degree of accuracy, putting the part in substantially perfect balance.

The invention is susceptible of considerable modification, and it is, of course, applicable to objects of any shape or size; for example, it may be used in balancing crankshafts, motor and generator armatures, propeller shafts, flywheels, turbines and so on. While the type of indicator employing a tilting mirror and light beam has been used obviously the principle of locating the indicator actuating means at the nodal points may be employed with any type of indicator. Some advantage of the invention may be obtained where the ends of the shaft are confined in their movement to a particular plane or arc by the location of the indicating means at nodal points. Various other modifications are included within the scope of the accompanying claims.

The phrase "model body" used in the claims has reference to a body of the same general configuration as the bodies to be tested but having unbalance only in one or the other of the selected planes of correction. The nodal points of the model body may be ascertained either by experiment as disclosed in this specification or by other methods known to those skilled in the art, such as by mathematical or graphical analysis.

I claim:

1. In a balancing machine, means for supporting the part to be balanced so as to permit it when rotated to oscillate about a nodal point determined by the distribution of masses in the part, means for rotating the part, a rigid element, means operatively connecting axially spaced portions of the part with axially spaced portions of the element to cause the element to oscillate in synchronism with the part to be balanced, an indicator, and an actuating connection between the indicator and the rigid element located at a nodal point toward one end of the element produced solely by unbalance at a predetermined location toward the other end of the part, whereby the indicator gives a correct indication of the amount of unbalance at a corresponding predetermined location at its end of the part.

2. In a balancing machine, means for supporting the part to be balanced so as to permit it when rotated to oscillate about a nodal point determined by the distribution of masses in the part, means for rotating the part, a rigid element, means operatively connecting axially spaced portions of the part with axially spaced portions of the element to cause the element to oscillate in synchronism with the part to be balanced, an indicator, an actuating connection between the indicator and the rigid element located at a nodal point toward one end of the element produced solely by unbalance at a predetermined location toward the other end of the part, whereby the indicator gives a correct indication of the amount of unbalance at a corresponding predetermined location at its end of the part and means associated with the indicator and with the rotating means for the part for indicating the angle of unbalance.

3. In a balancing machine, means for supporting the part to be balanced so as to permit it when rotated to oscillate about a nodal point determined by the distribution of masses in the part, means for rotating the part, a rigid element, means operatively connecting axially spaced portions of the part with axially spaced portions of the element to cause the element to oscillate in synchronism with the part to be balanced, indicators, and actuating connections between each of said indicators and the rigid element, each of said connections being located at a nodal point on the element produced solely by unbalance at a predetermined location toward the other end of the part.

4. In a balancing machine, means for supporting the part to be balanced so as to permit it when rotated to oscillate about a nodal point determined by the distribution of masses in the part, means for rotating the part, a rigid element, means operatively connecting axially spaced portions of the part with axially spaced portions of the element to cause the element to oscillate in synchronism with the part to be balanced, indicators, actuating connections between each of said indicators and the rigid element, each of said connections being located at a nodal point on the element produced solely by unbalance at a predetermined location toward the other end of the part, each of said connections causing the corresponding indicator to indicate the amount of unbalance at the predetermined location adjacent the respective connection, and means associated with each indicator and with the supporting and rotating means for the part for indicating the angle of the indicated unbalance.

5. The method of measuring unbalance in rotatable bodies which consists in selecting planes of correction adjacent the ends of the body to be tested, applying unbalance to a similar but perfectly balanced body in one of said planes of correction, rotating the last named body and determining the nodal point produced by such unbalance, applying unbalance to a similar but perfectly balanced body in the other of said planes of correction, rotating the last named body and determining the nodal point produced by such unbalance, rotating the body to be tested and determining the amount of unbalance in said planes of correction by measuring at said nodal points the radial forces produced by unbalance.

6. The method of measuring unbalance in rotatable bodies which consists in selecting planes of correction adjacent the ends of the body to be tested, applying unbalance to a similar but perfectly balanced body in one of said planes of correction, rotating the last named body and determining the nodal point produced by such unbalance, applying unbalance to a similar but perfectly balanced body in the other of said planes of correction, rotating the last named body and determining the nodal point produced by such unbalance, rotating the body to be tested and determining the amount of unbalance in said planes of correction by measuring at said nodal points the radial forces produced by unbalance and determining the angular locations of unbalance by observing the angular positions of the body when producing the maximum measurements of unbalance.

7. The method of measuring unbalance in rotatable bodies which consists in selecting planes of correction adjacent the ends of the body to be tested, applying unbalance to a similar but perfectly balanced body in one of said planes of correction, rotating the last named body and determining the nodal point produced by such unbalance, rotating the body to be tested and determining the amount of unbalance in the other of said planes of correction by measuring at said nodal point the radial force produced by such unbalance.

8. The method of measuring unbalance in rotatable bodies which consists in selecting planes of correction adjacent the ends of the body to be tested, applying unbalance to a similar but perfectly balanced body in one of said planes of correction, rotating the last named body and determining the nodal point produced by such unbalance, rotating the body to be tested and determining the amount of unbalance in the other of said planes of correction by measuring at said nodal point the radial force produced by such unbalance and determining the angular location of unbalance by observing the angular position of the body to be tested when producing the maximum measurement of unbalance.

9. The method of balancing rotating bodies which consists in selecting planes of correction adjacent the ends of the body to be balanced, applying unbalance to a similar but perfectly balanced body in one of said planes of correction, connecting a rigid element to the balanced body so that when the balanced body is rotated the rigid element duplicates the oscillatory movement of the balanced body about the nodal point resulting from the unbalance, determining the location of the nodal point, replacing the perfectly balanced body with a similar body to be tested, rotating the last-named body and measuring the amplitude of movement of the rigid element at the said nodal point thereby obtaining a measure of the amount of out-of-balance at the end of the body in which the nodal point is located.

10. The method of balancing rotating bodies which consists in selecting planes of correction adjacent the ends of the body to be balanced, applying unbalance to a similar but perfectly balanced body in one of said planes of correction, connecting a rigid element to the balanced body so that when the balanced body is rotated the rigid element duplicates the oscillatory movement of the balanced body about the nodal point resulting from the unbalance, determining the location of the nodal point, replacing the perfectly balanced body with a similar body to be tested, rotating the last-named body and measuring the amplitude of movement of the rigid element at the said nodal point thereby obtaining a measure of the amount of out-of-balance at the end of the body in which the nodal point is located, and determining the angular position of unbalance by observing the angular position of the body corresponding to the indication of maximum displacement.

11. In a balancing machine the combination of means for supporting a part to be balanced so as to permit it, when rotated, to oscillate about whatever nodal point is determined by the distribution of masses in the part, means for rotating the part, a rigid element, means for supporting the rigid element so as to permit it to oscillate in synchronism with the part, means for transmitting oscillatory movement from the part to the rigid element so as to cause it to oscillate in synchronism with said part, indicators for indicating the amount of movement of said element, said indicators being operatively associated with the element at predetermined axially spaced nodal points, each of said nodal points being determined by unbalance existing solely in a predetermined plane of correction at the opposite end of the part whereby each indicator gives a correct indication of the amount of unbalance existing in the plane of correction in its end of the part.

12. In a balancing machine the combination of means for supporting a part to be balanced so as to permit it, when rotated, to oscillate about whatever nodal point is determined by the distribution of masses in the part, means for rotating the part, a rigid element, means for supporting the rigid element so as to permit it to oscillate in synchronism with the part, means for transmitting oscillatory movement from the part to the rigid element so as to cause it to oscillate in synchronism with said part, indicators for indicating the amount of movement of said element, said indicators being operatively associated with the element at predetermined axially spaced nodal points, each of said nodal points being determined by unbalance existing solely in a predetermined plane of correction at the opposite end of the part whereby each indicator gives a correct indication of the amount of unbalance existing in the plane of correction in its end of the part, each of said indicators comprising means driven in synchronism with the rotation of the body arranged to correlate the indications of the amount of unbalance with the angular position of the shaft to give the angular location of unbalance.

13. In a balancing machine, means for supporting the part to be balanced so as to permit it when rotated to oscillate about a nodal point determined by the distribution of masses in the part, means for rotating the part, a rigid element, means operatively connecting axially spaced portions of the part with axially spaced portions of the element to cause the element to oscillate in synchronism with the part to be balanced, an indicator, and means for actuating the indicator including means engaging the rigid element at a nodal point toward one end of the element produced solely by unbalance at a predetermined location toward the other end of the part, whereby the indicator gives a correct indication of the amount of unbalance at a corresponding predetermined location at its end of the part.

14. In apparatus for analyzing the unbalance of an elongated rotatable body into components respectively associated with a plurality of axially spaced radial planes in the body, a mounting structure rotatably supporting the body, a member extending along substantially the entire length of the body and so associated with said mounting structure as to vibrate in accordance with the vibrations of the body, a device for generating an observable quantity having characteristics determined by the vibrations to which the device is subjected, means for selectively connecting such device with the member at various points thereof along a substantial portion of its entire length, such portion being at least inclusive of the null points of the vibrations respectively produced by unbalance forces associated with each of said radial planes in the rotatable body, and means associated with said device for analyzing the characteristics of said observable quantity in terms of the amount and location of the unbalance forces producing such vibrations.

15. Apparatus for analyzing the unbalance of an elongated rotatable body comprising a mounting structure including means for rotatably supporting the body, a vibration responsive device for generating an observable quantity having characteristics which are determined by those of the vibrations to which the device is subjected, means for connecting said device to a point of said mounting structure which is a null point with respect to vibrations produced by unbalance forces associated with one end of said body but is subject to vibrations having characteristics determined by the amount and location of unbalance forces associated with the other end of said body, and means for analyzing the characteristics of said observable quantity, thereby to ascertain the amount and location of the unbalance forces associated with said other end of said body.

16. Apparatus for indicating the unbalance of a rotor, in combination means for mounting a rotor to be free to oscillate in a given plane when unbalanced and caused to rotate, unbalance indicating means disposed to sense oscillations of said first named means substantially in the line of intersection of a plane normal to the plane of oscillation of the rotor and intersecting said plane of oscillation at a region in which no oscillations of the rotor take place when the rotor is unbalanced only in a given unbalance correction plane of the rotor, and another unbalance indicating means disposed to sense oscillations of said first named means substantially in the line of intersection of another plane normal to the plane of oscillation of the rotor and intersecting said plane of oscillation at a region in which no oscillations of the rotor take place when said rotor is unbalanced only in another given correction plane of the rotor.

17. Apparatus for indicating the unbalance of a rotor, in combination, supporting means for mounting a rotor to be free to oscillate in a horizontal plane when unbalanced and caused to rotate on an axis substantially included in said horizontal plane, first unbalance indicating means disposed to sense horizontal oscillations of said supporting means at a region in which no oscillations of the supporting means take place when the rotor is unbalanced only in a first unbalance correction plane of the rotor, and another, or second, unbalance indicating means disposed to sense horizontal oscillations of said supporting means at a given region in which no oscillations of the supporting means take place when the rotor is unbalanced only in a second unbalance correction plane, whereby the indications of the first unbalance indicating means are a measure of the rotor unbalance in the second unbalance correction plane and the indications of the second unbalance indicating means are a measure of the rotor unbalance in the first unbalance correction plane.

18. The method of determining unbalance in rotatable bodies which consists in ascertaining the nodal points along the axis of rotation of a model body having unbalance only in selected planes of correction at opposite ends of said body, rotating the body to be tested and measuring the amplitude of movement of the test body at points corresponding to the nodal points of the model body.

19. The method of determining unbalance in rotatable bodies which consists in ascertaining the nodal point along the axis of rotation of a model body having unbalance only in a selected plane of correction at one end of said body, ascertaining the nodal point along the axis of rotation of a model body having unbalance only in a selected plane of correction at the other end of said body, rotating the body to be tested and measuring the amplitude of movement of the test body at points corresponding to said nodal points.

20. The method of determining unbalance in rotatable bodies which consists in ascertaining the nodal point along the axis of rotation of a model body having unbalance only in a selected plane of correction at one end of said body, ascertaining the nodal point along the axis of rotation of a model body having unbalance only in a selected plane of correction at the other end of said body, rotating the body to be tested and measuring the amplitude of movement of the test body at points corresponding to said nodal points, and determining the angular location of unbalance by observing the angular positions of the test body when producing the maximum amplitude of movement at said nodal points.

THOMAS C. VAN DEGRIFT.